United States Patent [19]

Loomer

[11] 4,345,524
[45] Aug. 24, 1982

[54] LOAD CARRYING VEHICLE AND TRACK THEREFOR

[75] Inventor: Weston R. Loomer, Walton, Ky.

[73] Assignee: Litton Systems, Inc., Florence, Ky.

[21] Appl. No.: 124,773

[22] Filed: Feb. 26, 1980

[51] Int. Cl.³ .................. B62D 21/00; B60P 1/00; B61F 1/00
[52] U.S. Cl. .................................. 105/404; 105/155; 238/122; 280/104
[58] Field of Search ................. 105/355, 364, 404; 238/122; 280/104; 414/273, 284

[56] References Cited

U.S. PATENT DOCUMENTS

| | | | |
|---|---|---|---|
| 3,584,892 | 6/1971 | Moore | 280/104 |
| 3,598,061 | 8/1971 | Flowers | 105/364 |
| 4,175,763 | 11/1979 | Conner, Jr. | 280/104 |

*Primary Examiner*—Richard A. Bertsch
*Attorney, Agent, or Firm*—Herbert A. Stern

[57] ABSTRACT

A structure for a load carrying vehicle and the track therefor. The load carrying vehicle includes a load carrying platform and a pair of side plates, one plate located adjacent to each of the platform sides. The side plates are structurally weakened, that is, the rigidity of the side plates is controlled by, for example, fabricating them to include grooves, apertures, etc., so that the vehicle may deflect longitudinally. This is done so that all the wheels of the vehicle will be in contact with the track, and thereby serve to support at least part of the load being carried, thus improving the weight distribution of the vehicle load on the wheels and on the track. The track provided for supporting the load carrying vehicle, which track may be fabricated by roll forming a sheet of steel, includes four sections, two of which sections join the other two at an obtuse angle thereby providing a pivot point or flexure. The section of track supporting a vehicle wheel is thus enabled to pivot or flex away from the wheel, thereby permitting a more equal distribution of the load carried by the vehicle on the vehicle wheels and on the track on which the vehicle rides.

7 Claims, 7 Drawing Figures

LOAD CARRYING VEHICLE AND TRACK THEREFOR

BACKGROUND OF THE INVENTION

This invention relates to an automated storage and retrieval system and more particularly to a structure for a vehicle and the track on which such vehicle rides suitable for use in such a system.

Automated storage and retrieval systems of the type presently known in the art are generally rack structures which include a plurality of lanes and a number of aisles which extend orthogonally form each lane. Items being stored in the rack, such as loaded pallets, are positioned in the aisles. To retrieve a loaded pallet from a position within an aisle or to deposit a loaded pallet therein, it is necessary for a vehicle, commonly referred to as a satellite vehicle, to enter the aisle. These aisles are formed by pairs of horizontal rails, which rails function as tracks for the satellite vehicles.

The use of such automated storage and retrieval systems including such automated satellite vehicles has contributed greatly to the efficiency and economy of modern warehousing. However, as such satellite vehicles are called upon to carry larger, that is, heavier loads, it has become necessary to increase the structural strength of the rack structure, part of which functions as the rails upon which such satellite vehicles travel. With such warehouses now reaching heights in the area of 100 feet and containing tens of thousands of pallet positions, each increase required in the structural strength of the rack means many additional tons of steel being used to fabricate the rack structure and thus, in turn, results in substantially increased costs. Clearly, constantly increasing rack strength to accommodate the ever-increasing loads stored and moved within the racks results in constantly increasing the cost of fabricating and operating a system which was originally conceived as one which would decrease costs.

A number of structural concepts have been developed in an attempt to provide a solution to the aforementioned problem. For example, larger wheels have been provided for the satellite vehicles in an effort to enable them to carry the heavier loads. However, the provision of relatively large wheels on vehicles which usually have a mimimum of eight wheels per vehicle (four on each side arranged in pairs with one pair at the front end and one pair at the aft end of the vehicle), has greatly added to the cost of such vehicles. Another potential solution which has been developed has been to coat the vehicle wheels with a deformable material, such as, for example, a urethane, thereby insuring that each wheel will have a larger footprint, thus enabling it to support a greater portion of the vehicle load without increasing wheel size. None of these solutions, however, has proved to be completely satisfactory. This is due, at least in part, to the fact that unless the rack structure itself is made substantially more rigid, it deflects longitudinally, thereby causing a major portion, if not all, of the load weight to be supported solely by the outer wheels (i.e., the forward and aft wheels of each pair) of the vehicle without assistance, or with only minimal assistance, from the interior vehicle wheels.

SUMMARY OF THE INVENTION

It is, therefore, an important object of the instant invention to provide a structure for a load carrying vehicle adapted to ride on a longitudinally extending track by means of which the aforesaid drawbacks and disadvantages may be most efficaciously avoided.

It is a further object of the invention to provide such a structure in which all the wheels of the vehicle aid in supporting the weight of the load on the vehicle.

It is still a further object of the instant invention to provide a structure for such a vehicle which will permit such vehicle to deflect longitudinally when under load in such a manner that it will generally conform to the longitudinal deflection of the track structure under load.

It is yet another important object of the instant invention to provide a track for a load carrying vehicle by means of which the aforesaid drawbacks and disadvantages may be most efficaciously avoided.

It is a still further object of the invention to provide such a track structure wherein the portion thereof under greatest load deflects more than adjacent portions of the track which are not under load.

Generally speaking, the objectives of the instant invention are attained by the provision of a load carrying vehicle adapted to ride on a track comprising a frame, a load carrying platform having first and second longitudinally spaced ends and first and second transversely spaced ends coupled to the frame, first and second side plates, one located adjacent to each of the first and second sides of the platform and oriented generally perpendicularly thereto, coupled to the frame, and at least four wheels coupled to the frame adjacent to each of the side plates, the first and second of the four wheels being exterior wheels and being positioned adjacent to the first and second ends of the platform and the third and fourth of the wheels being interior wheels, the interior wheels being located longitudinally inward of the first and second wheels, respectively, wherein the track deflects longitudinally under load, and wherein the first and second vehicle side plates are structured to longitudinally deflect under load, whereby a load on the vehicle is supported by the third and fourth wheels as well as by the first and second wheels.

The objectives of the present invention are also attained by the provision of a track for a load carrying vehicle comprising a first section, having first and second ends, adapted to support the wheel tread of a vehicle, the first section extending in a first plane, a second section, having first and second ends, extending from the first end of the first section, the second section being oriented at an acute angle relative to a second plane, which second plane is generally perpendicular to the first plane, a third section, having first and second ends, extending from the end of the second section opposite to the first section, the third section extending generally in the second plane, and a fourth section, extending from the end of the third section opposite to the second section, the fourth section extending generally in the first plane, wherein the first section is adapted to pivot away from the frist plane in response to a force applied by the vehicle.

The foregoing and other objects and features of the present invention will be more clearly understood from the following detailed description thereof, when read in conjunction with the accompanying drawings, in which.

DESCRIPTION OF THE PREFERRED EMBODIMENTS

Figure 1:
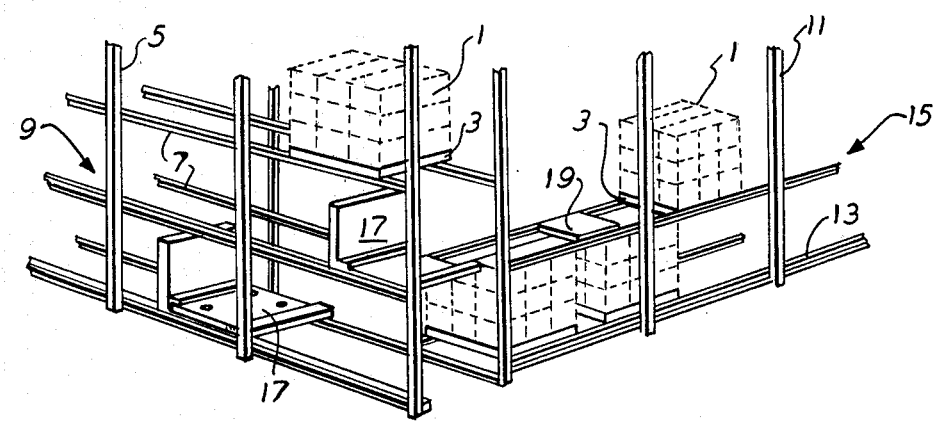
FIG. 1 is a perspective view of an automated warehousing system including the inventive vehicle and the track

Referring to the drawings, FIG. 1 illustrates a conventional warehousing system featuring the automatic storage and retrieval of articles indicated at 1, which articles are carried by pallets indicated at 3. The multi-tiered storage system illustrated is formed by a number of vertical structural members or beams 5 which combine with pairs with horizontal rails 7 (which rails function as tracks), to form lanes 9, three levels of such lanes 9 being illustrated in FIG. 1. A number of vertical members or beams 11, generally comparable to those indicated at 5, are provided as are a number of pairs of horizontal rail or track members 13. Although the horizontal rail members 7 are generally comparable to those in conventional prior art systems, those illustrated at 13 are different from those in the prior art and will be more fully discussed below. The beams 11 and the tracks 13 combine to form the aisles 15 of the warehousing system and, although only one aisle is illustrated in FIG. 1, it will be understood that a number of aisles 15 are associated with each level of the lanes 9.

As is well known in the art (a typical system being illustrated in U.S. Pat. No. 3,973,685), such systems conventionally include transfer vehicles arranged to move along the tracks 7 of the lane 9, such a transfer vehicle being indicated at 17. The transfer vehicle 17 is arranged to carry a satellite vehicle, indicated at 19, to a selected aisle 15 whereupon the satellite vehicle leaves the transfer vehicle and travels to a desired position in such aisle where it deposits or retrieves a loaded pallet 3. As will readily be understood, especially with reference to FIGS. 3-5 below, as the weight of the load 1 on the pallet 3 increases, the load which must be supported by the satellite vehicle 19 and by the track 13 steadily increases. Of course, as the satellite vehicles 19 and the track 13 have been made structurally stronger, stronger, i.e. more rigid, deal with these increased loads, the costs of such storage systems has risen rapidly.

Figure 2:
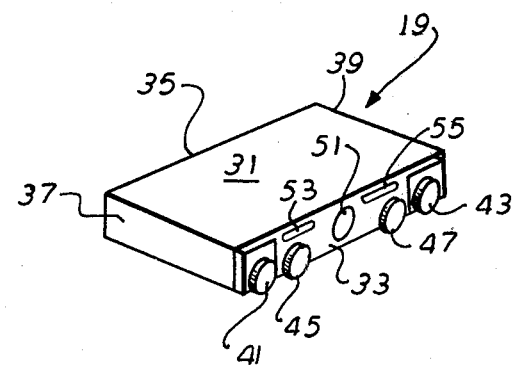
FIG. 2 is a detailed perspective view of the inventive load carrying satellite vehicle.

Turning now to FIG. 2 there is illustrated a detailed perspective view of a satellite vehicle 19 according to the invention. The vehicle 19 includes a top plate or lift table 31 which acts as a load carrying platform first and second side plates, indicated at 33 and 35, and first and second end plates, indicated at 37 and 39. The side plates 33 and 35 may form part of the frame, of the satellite vehicle 19, or and internal frame, not shown, may be utilized. In the instant embodiment, the side plates 33 and 35 are coupled to an interior frame. Further the lift table 31 is coupled to the internal frame in such a manner that it may be raised or lowered for retrieving or depositing, respectively, a loaded pallet 3. Suitable mechanisms for raising and lowering the load carrying platform 31 are well known in the art and include, for example, hydraulic piston units, cam arrangements, etc. The side plates 33 and 35 are located adjacent to the first and second sides of the platform 31, respectively, are oriented generally perpendicular thereto. The end plates 37 and 39 are located adjacent each of the first and second ends, respectively, of the load carrying platform 31 and they too are oriented generally perpendicularly with respect to the platform 31 and they too are coupled to the interior frame of the vehicle 19 (in the event that they do not themselves form part of the frame). Coupled to the frame adjacent to the side plates are a number of support wheels. In the embodiment here illustrated, the vehicle 19 includes eight wheels (four on each side), although, as is well known in the art, such vehicles frequently include as many as 16 wheels (8 wheels on each side) and may even include more wheels. The wheels indicated at 41 and 43 are referred to as exterior wheels and they are positioned adjacent to the ends of the vehicle 19. The wheels 45 and 47 are referred to as interior wheels, these wheels being located longitudinally inward of the wheels 41 and 43, respectively. As will readily be seen from the drawings, the wheels 41 and 45 are paired and wheels 43 and 47 are paired (in the sense that the wheel pairs are generally offset toward the ends of the vehicle 19), although, it must be understood, the wheels may also be longitudinally symmetrically distributed. It will further be understood from the drawings that the wheels 41-47 each extend equi-distantly outward relative to the sides 33 and 35, that is, all the wheels lie in the same transverse plane.

In the inventive embodiment here illustrated, the side plates 33 and 35 are each formed with a circular aperture, indicated at 51, and one or more longitudinally extending grooves, indicated at 53 and 55, respectively. The purpose of the aperture and the grooves illustrate in FIG. 2 will be explained in greater detail in conjunction with the description of FIGS. 3-5 below.

Figure 3:
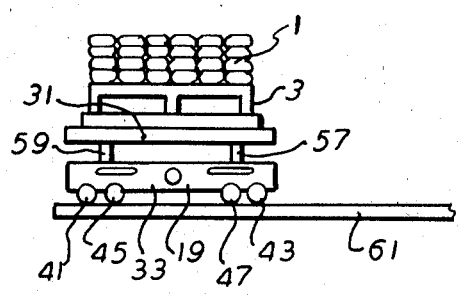
FIG. 3 is a schematic side view of an idealized satellite vehicle and track therefor supporting a load.

Turning to FIG. 3 there is illustrated a schematic side view of an idealized satellite vehicle 19 and the track 61 on which the satellite vehicle 19 rides while supporting a loaded pallet 3. It should be noted that, when the vehicle 19 is carrying a pallet, the platform 31 is in its raised configuration. The platform may be raised by any conventional mechanism and, in the embodiment here illustrated, it is supported by two pairs of hydraulic piston rods, indicated at 57 and 59. In such a structure, the track 61, which is conventionally made of steel undergoes no longitudinal deflection, that is, it remains perfectly straight and the satellite vehicle 19 with its structurally strong side plates 33 and 35 also undergoes no longitudinal deflection. Under such circumstances, of course, each of the wheels of the satellite vehicle 41-47 serves to support the vehicle 19 and the load 1. In the real world, of course, such an idealized structure cannot be attained and, as the loads 1 with which automated warehouses are required to cope become heavier, the idealized structure comes less attainable.

Figure 4:
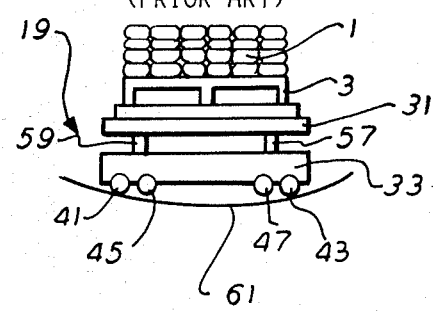
FIG. 4 is a schematic side view of a prior art satellite vehicle and track therefor supporting a load.

Turning now to FIG. 4, there is illustrated a schematic side view of a prior art satellite vehicle 19 riding on a longitudinally extending track 61 and supporting a load 1. As will be readily understood, the track 61 deflects longitudinally due to the substantial weight thereon. Because the side plates 33 and 35 of the vehicle 19 are longitudinally rigid the longitudinal deflection of the track 61 will substantially exceed the longitudinal deflection of the side plates 33 and therefore of the vehicle 19. The result of this unequal deflection is that the weight of the load is supported by the exterior wheels 41 and 43 and virtually none of the load weight, or at best, only a minor portion thereof, is supported by the interior wheels 45 and 47. As previously indicated, prior solutions to the problem presented by the above-noted unequal longitudinal deflections have included strengthing of the track 61 and increasing its longitudinal rigidity by using increased amounts of steel; utilizing larger wheels so that they will be able to support the relatively greater loads due to the unequal weight distribution; the use of wheels having a wider tread so as to increase the contact area of the wheels enabling them to sustain higher loads; and utilizing deformable materials to form the wheel treads to increase the wheel contact area. These structural modifications each, of course, utilize additional materials thereby increasing the costs of fabrication, erection, operation and maintenance of the system.

Figure 5:
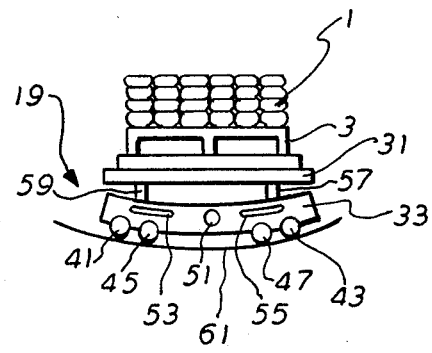
FIG. 5 is a schematic side view of the load carrying vehicle of the invention and the supporting track therefor supporting a load.

Turning now to FIG. 5 there is illustrated a schematic side view of the inventive satellite vehicle 19 and the track 61 on which it rides as it supports a load 1. As will be clear from examination of FIG. 5, the instant objective is to provide a vehicle structure which undergoes a longitudinal deflection under load matching that of the track on which the vehicle rides, thereby providing a more equal weight distribution on the load 1 on each of the wheels 41-47. This desired end is accomplished by two complementary structures. Firstly, the track 61 is structured so that, when under load from a wheel, it will move away from the wheel, thereby permitting adjacent wheels to come into contact with the track for sharing the support of the load carried by the vehicle 19, secondly, as illustrated in FIG. 5, the side plates 33 and 35 of the vehicle 19 are structured so that they will longitudinally deflect under load. The desired ability to deflect under load may be accomplished in a number of ways, all of which involve, in essence, controlling the structural rigidity of the side plate by, for example, weakening of the side plates. Thus, sections of material may be removed from the side plates 33 and 35 in any desired manner. In particular, longitudinally extending grooves 53 and 55 are formed in the side plates 33 and 35 in the embodiment here illustrated. Additionally, a circular aperture indicated at 51, is formed in each of the side plates. It will be understood, of course, that in some instances an aperture alone, or grooves alone, or some other structural weakening will be all that is required to provide the satellite vehicle 19 with the ability to deflect longitudinally to the desired degree under load. No particular formula or equation for determining the size and type of structural modifications required can be here provided because such a determination will be based upon, among other things, the weight of the load 1 to be supported; the inherent structural rigidity of the material used to fabricate the side plates 33 and 35; and the longitudinal rigidity of the track 61. Ideally, the side plate structure will be modified in such a manner that it will have a pre-selected longitudinal rigidity whereby the longitudinal deflection of the vehicle 19 under a particular load will match the longitudinal deflection of the track 61 when it is carrying the loaded vehicle.

As indicated above, the instant vehicle also contemplates the use of a track structure adapted to deflect in a manner that will provide for a more even, i.e., uniform distribution of the load on the track.

Figure 6:
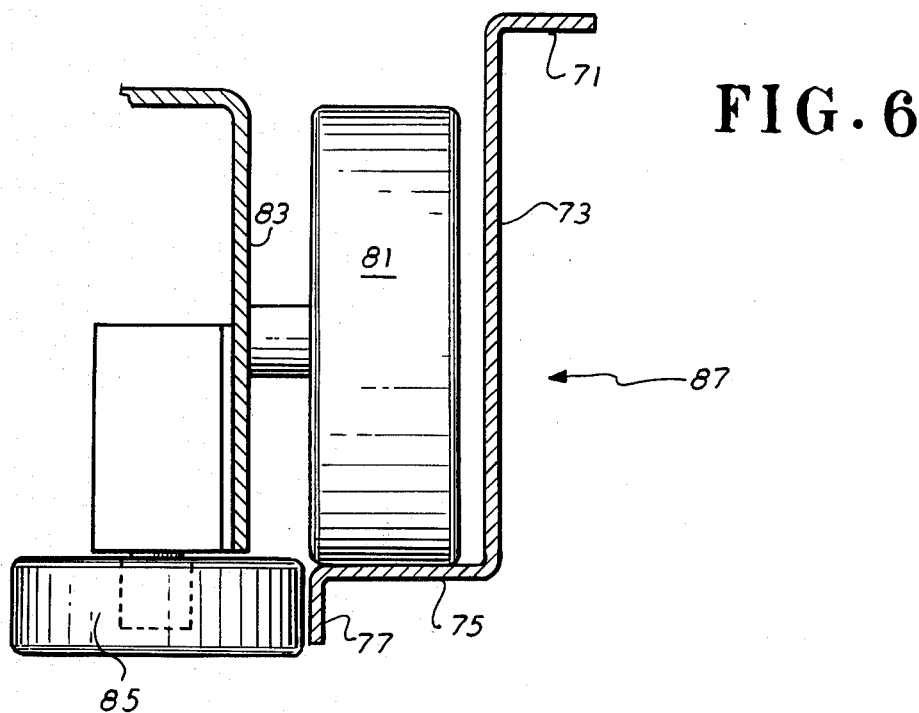
FIG. 6 is a cross-sectional view of a prior art track structure.

Turning now to FIG. 6, there is illustrated a cross-sectional view of a prior art track structure. The track, indicated at 87, includes a top flange section, indicated at 71, extending generally horizontally, a web portion 73 extending relatively perpendicularly relative to the top flange 71, a bottom flange section 75 extending from the web section 73 and being oriented generally horizontally, and a side flange section 77. A wheel 81 of a satellite vehicle 83 is supported by and rolls along the bottom flange section 75 and a side or guide wheel 85, coupled to the vehicle 83, rolls along the side flange 77. As will be understood, load weight applied through the wheel 81 to the flange 75 will cause the track 87 to deflect downwardly, as indicated in FIG. 4. This will, of course, result in a loss of contact between the wheels 45 and 47 of a satellite vehicle 19 and the track surface 75 (with a concomitant loss of support) when a longitudinally rigid satellite vehicle structure is utilized.

Figure 7:
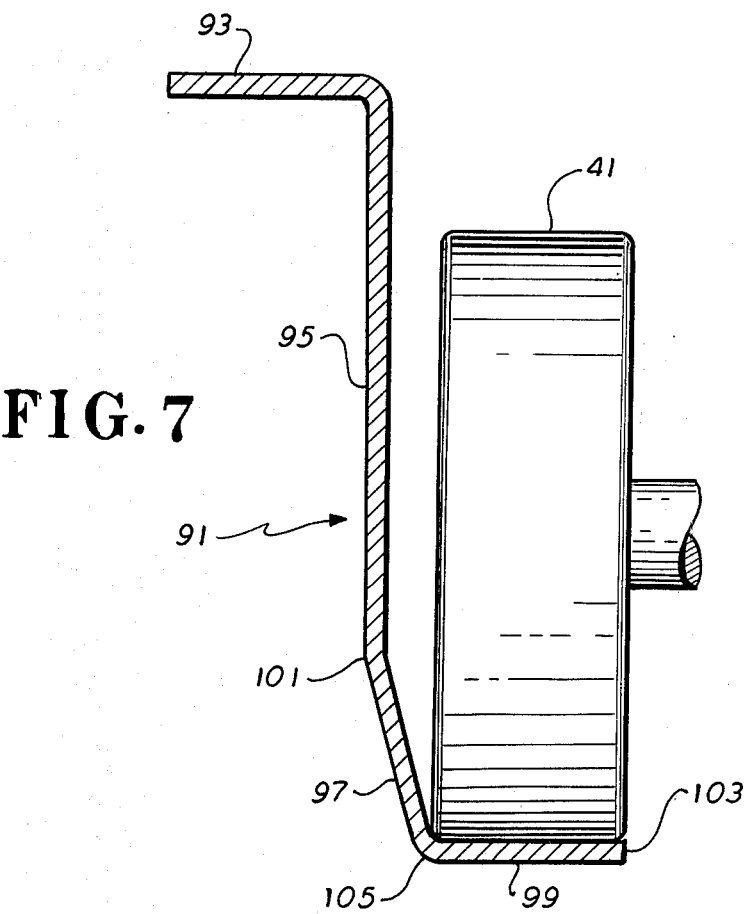
FIG. 7 is a cross-sectional view of the inventive track structure of the instant invention.

Turning now to FIG. 7, there is illustrated the track structure of the instant invention, which structure is indicated generally at 91 and which may be fabricated by, for example, roll forming ten guage pre-galvanized steel sheet stock. The track 91 includes a top flange, indicated at 93, which extends in a generally horizontal plane, an upper web section, indicated at 95, extending from the flange 93 and being oriented in a generally vertical plane, a lower web section, indicated at 97 which extends from the upper web section 95 and which is oriented to form an acute angle (here illustrated as 15°) from the vertical, and a bottom flange section, indicated at 99, which extends from the lower flange section 97 and which extends in a generally horizontal direction. Supported by the lower flange 99 is a wheel, for example, the wheel 41 of the satellite vehicle 19. When a sufficiently heavy load is provided to the wheel 19 and the wheel 41 therefore applies a sufficient force to the bottom or wheel support flange 99, sections 99 and 97 of the track 91 pivot or flex about the junction or flexure point, indicated at 101, of the lower web section 97 and the upper web section 95. This pivoting about the junction point 101 causes the track support flange 99 to, in essence, move away from the tread of the wheel 41. This results in a decrease in the pressure applied by the wheel 41 at the end of the flange 99 indicated at 103 (which end 103 extends toward the interior of the satellite vehicle 19) and an increase in the pressure applied by the wheel 41 at the junction point indicated at 105, which is the point at which the bottom flange 99 and the lower web section 97 meet. Because the track 91 is structured so that it will pivot about the junction point 101 in response to force applied by the wheel 41 in such manner that the pressure of the wheel at the point 103 will decrease, the track section supporting the most weight will deflect longitudinally. This deflection, causes an adjacent interior wheel, which would otherwise lose contact with the track, to come into contact with the track and support a portion of the weight of the load, thereby improving the distribution of the carried load by the wheels of the satellite vehicle and by the track. This more equal weight distribution will, of course, provide beneficial effects in that smaller vehicle wheels can be used (because each wheel supports a portion of the load rather than only some of the wheels supporting all of the load) and because the track itself can be fabricated from less material than can one which is intended to be a longitudinally rigid structure, as is the track illustrated in FIG. 6. It will be understood, of course, that the more equal weight distribution effect, which is desired, is more readily realized when the satellite vehicle structure illustrated in FIGS. 2 and 5 is utilized in conjunction with the track illustrated in FIG. 7.

Although the inventive vehicle and track therefore have been here described in terms of their use in conjunction with an automated storage and retrieval system the instant structures could also be utilized in other applications in which load supporting vehicles ride on longitudinally deflectable structures.

It will be understood that the foregoing description of the preferred embodiments of the present invention is for purposes of illustration only and that various structural and operational features as herein disclosed are susceptible to a number of modification and changes, none of which entail any departure from the spirit and scope of the present invention as defined in the hereto appended claims.

I claim:

1. A load carrying vehicle adapted to ride on a track which deflects longitudinally under load comprising:
    a frame;
    a load carrying platform having first and second longitudinally spaced ends and first and second transversely spaced sides coupled to said frame;
    first and second side plates, one located adjacent to each of said first and second sides of said platform and oriented generally perpendicularly thereto, coupled to said frame; and
    at least four wheels coupled to said frame adjacent to each of said side plates, the first and second of said four wheels being exterior wheels and being positioned adjacent to the first and second ends of said platform and the third and fourth of said wheels being interior wheels, said interior wheels being located longitudinally inward of said first and second wheels, respectively,
    wherein said first and second vehicle side plates are structured to longitudinally bend under load, whereby a load on said vehicle is supported by said third and fourth wheels as well as by said first and second wheels.

2. A load carrying vehicle according to claim 1 wherein said interior wheels and said exterior wheels are located in the same transverse plane.

3. A load carrying vehicle according to claim 1 wherein each of said side plates is structured so as to have a pre-selected longitudinal rigidity whereby said side plates are adapted to longitudinally deflect under load.

4. A load carrying vehicle according to claim 3 wherein each of said side plates is formed with a groove therein.

5. A load carrying vehicle according to claim 4 wherein said groove extends longitudinally.

6. A load carrying vehicle according to claim 3 wherein each of said side plates is formed with an aperture therein.

7. A load carrying vehicle according to claim 6 wherein said aperture is circular.

* * * * *